(12) United States Patent
Nakamura

(10) Patent No.: US 11,316,995 B2
(45) Date of Patent: Apr. 26, 2022

(54) BENDING DETECTION DEVICE AND IMAGE PROCESSING APPARATUS

(71) Applicant: FUJIFILM Business Innovation Corp., Tokyo (JP)

(72) Inventor: Takayuki Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/114,337

(22) Filed: Dec. 7, 2020

(65) Prior Publication Data

US 2021/0337080 A1 Oct. 28, 2021

(30) Foreign Application Priority Data

Apr. 22, 2020 (JP) .............................. JP2020-076256

(51) Int. Cl.
*G06F 3/12* (2006.01)
*H04N 1/00* (2006.01)

(52) U.S. Cl.
CPC ..... *H04N 1/00726* (2013.01); *H04N 1/00771* (2013.01)

(58) Field of Classification Search
CPC ........................ H04N 1/00726; H04N 1/00771

USPC ......................................... 358/1.1–1.18, 474
See application file for complete search history.

(56) References Cited

U.S. PATENT DOCUMENTS

| 6,954,290 B1* | 10/2005 | Braudaway | G06K 9/3283 |
| | | | 358/3.26 |
| 10,623,603 B1* | 4/2020 | Nakamura | G06K 9/3283 |
| 2005/0238205 A1* | 10/2005 | Kimura | G06K 9/03 |
| | | | 382/112 |
| 2014/0168733 A1* | 6/2014 | Schaertel | H04N 1/00039 |
| | | | 358/504 |
| 2015/0070732 A1* | 3/2015 | Kishi | H04N 1/00737 |
| | | | 358/3.27 |
| 2018/0234568 A1* | 8/2018 | Das | G01N 21/89 |

FOREIGN PATENT DOCUMENTS

JP 2012-222764 11/2012

* cited by examiner

*Primary Examiner* — Gabriel I Garcia
(74) *Attorney, Agent, or Firm* — JCIPRNET

(57) ABSTRACT

A bending detection device includes a processor configured to receive a read image obtained by reading a document, and notify a user of a bend in the document based on a determination that the read image has been obtained by reading the document in a bent state.

13 Claims, 9 Drawing Sheets

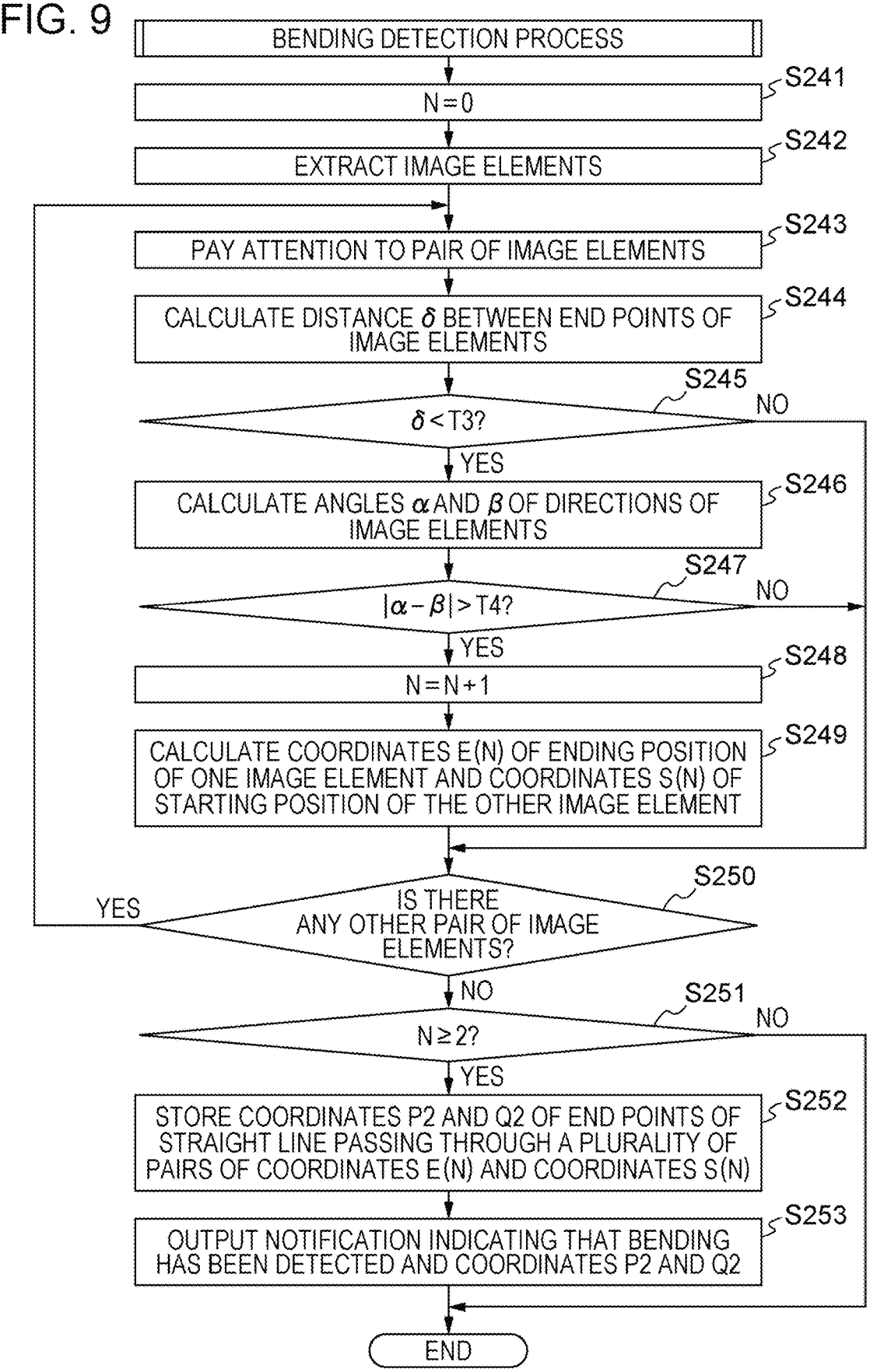

BENDING DETECTION DEVICE AND IMAGE PROCESSING APPARATUS

CROSS-REFERENCE TO RELATED APPLICATIONS

This application is based on and claims priority under 35 USC 119 from Japanese Patent Application No. 2020-076256 filed Apr. 22, 2020.

BACKGROUND

(i) Technical Field

The present disclosure relates to a bending detection device and an image processing apparatus.

(ii) Related Art

An image processing apparatus that estimates that the size of a document is not correctly detected in the case where a detection result of the size of the document fluctuates a predetermined number of times within a predetermined period of time due to curling or bending of the document when the size of the document is automatically detected and displays a document size setting screen for setting the size of a document in the case where it is estimated that the size of the document is not correctly detected has been known (see, for example, Japanese Unexamined Patent Application Publication No. 2012-222764).

SUMMARY

Documents in a bent state may be read. In such a case, with a configuration in which only a notification indicating that the size of a document is not correctly detected is provided, a user is not able to recognize that the document is bent.

Aspects of non-limiting embodiments of the present disclosure relate to allowing a user to recognize that a document is bent.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a bending detection device including a processor configured to receive a read image obtained by reading a document, and notify a user of a bend in the document based on a determination that the read image has been obtained by reading the document in a bent state.

BRIEF DESCRIPTION OF THE DRAWINGS

Exemplary embodiments of the present disclosure will be described in detail based on the following figures, wherein:

FIG. 9 is a flowchart illustrating a processing example of the second and third bending detection processes.

DETAILED DESCRIPTION

Exemplary embodiments of the present disclosure will be described in detail with reference to attached drawings.

Hardware Configuration of Image Processing Apparatus

Figure 1:
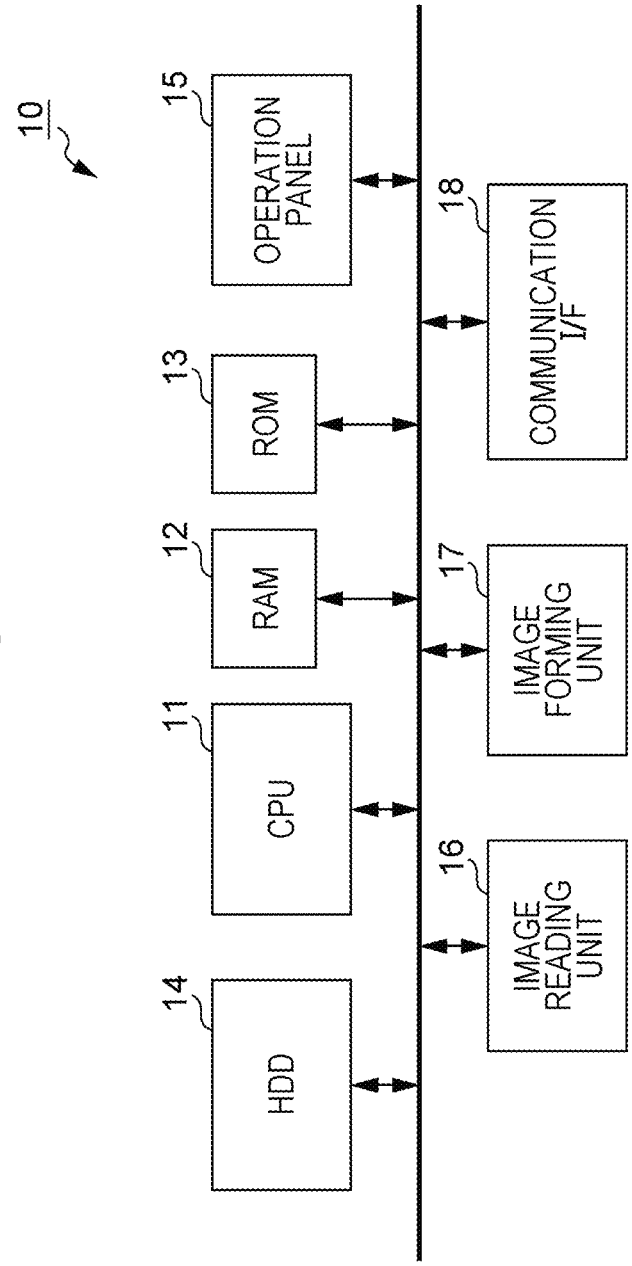
FIG. 1 is a diagram illustrating an example of the hardware configuration of an image processing apparatus according to an exemplary embodiment of the present disclosure.

FIG. 1 is a diagram illustrating an example of the hardware configuration of an image processing apparatus 10 according to an exemplary embodiment. As illustrated in FIG. 1, the image processing apparatus 10 includes a central processing unit (CPU) 11, a random access memory (RAM) 12, a read only memory (ROM) 13, a hard disk drive (HDD) 14, an operation panel 15, an image reading unit 16, an image forming unit 17, and a communication interface (hereinafter, referred to as a "communication I/F") 18.

The CPU 11 implements functions described below by loading various programs stored in the ROM 13 and the like into the RAM 12 and executing the programs.

The RAM 12 is a memory that is used as an operation memory or the like for the CPU 11. The ROM 13 is a memory that stores various programs and the like to be executed by the CPU 11. The HDD 14 is, for example, a magnetic disk device that stores image data read by the image reading unit 16, image data to be used for image formation by the image forming unit 17, and the like.

The operation panel 15 is, for example, a touch panel that displays various types of information and receives an operation input by a user. The operation panel 15 includes a display on which various types of information are displayed and a position detection sheet that detects a position indicated by a finger or indicating means such as a stylus pen. The operation panel 15 may include a display and a keyboard, in place of a touch panel.

The image reading unit 16 is an example of reading means and reads an image recorded on a recording medium such as paper. The image reading unit 16 is, for example, a scanner. The image reading unit 16 may be of a charge coupled devices (CCD) type in which reflection light with respect to light applied to a document from a light source is reduced using a lens and then received by CCD or a contact image sensor (CIS) type in which refection light with respect to light sequentially applied to a document from an LED light source is received by a CIS.

The image forming unit 17 forms an image on a recording medium such as paper. The image forming unit 17 is, for example, a printer. The image forming unit 17 may be of an electrophotographic system that forms an image by transferring toner attached on a photoreceptor to a recording medium or an ink jet system that forms an image by discharging ink onto a recording medium.

The communication I/F 18 transmits and receives various types of information to and from other apparatuses via a communication line.

Outline of Exemplary Embodiments

In an exemplary embodiment, the image processing apparatus 10 receives a read image obtained by reading a document. In the case where the read image has been obtained by reading the document in a bent state, the image processing apparatus 10 notifies a user that the document is bent.

In the case where any one of three conditions described below is satisfied, the image processing apparatus 10 determines that the read image has been obtained by reading the document in a bent state.

A first condition is that a read image includes a straight line indicating that a document is bent. The straight line indicating that a document is bent may be a straight line that forms an angle equal to or more than a threshold with respect to a horizontal direction and forms an angle equal to or more than a threshold with respect to a vertical direction.

A second condition includes a condition that a read image includes a string of first image elements and a string of second image elements, the string of the first image elements are arranged in a first direction, the string of the second image elements are arranged in a second direction different from the first direction, and the second image elements are of the same type as the first image elements. The second condition may further include a condition that the string of the first image elements ends at a first position and the string of the second image elements starts at a second position that is different from the first position and is within a predetermined distance from the first position.

A third condition is that a read image includes a first string of first image elements and a second string of second image elements, the first string of the first image elements ends at a first position, the second string of the second image elements starts at a second position different from the first position, and the second image elements are of the same type as the first image elements. The first position and the second position may be within a predetermined distance.

Functional Configuration of Bending Detection Device

Figure 2:
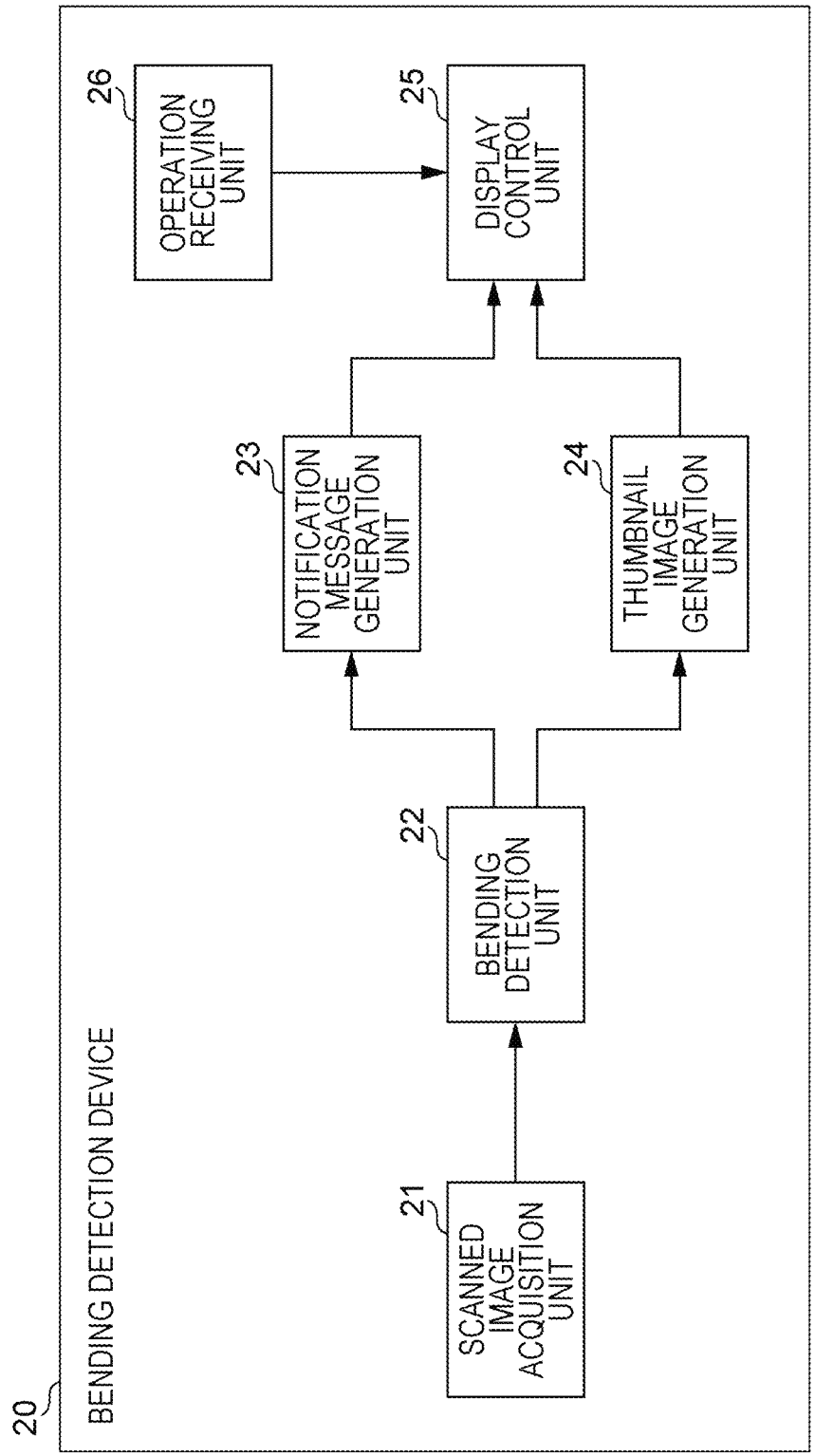
FIG. 2 is a block diagram illustrating an example of the functional configuration of a bending detection device according to an exemplary embodiment of the present disclosure.

FIG. 2 is a block diagram illustrating an example of the functional configuration of a bending detection device 20 according to an exemplary embodiment. The bending detection device 20 may be regarded as a device that is implemented when the CPU 11 (see FIG. 1) of the image processing apparatus 10 reads a program implementing functional units, which will be described below, from, for example, the ROM 13 (see FIG. 1) into the RAM 12 (see FIG. 1) and executes the program.

As illustrated in FIG. 2, the bending detection device 20 includes a scanned image acquisition unit 21, a bending detection unit 22, a notification message generation unit 23, a thumbnail image generation unit 24, a display control unit 25, and an operation receiving unit 26.

The scanned image acquisition unit 21 acquires a read image (scanned image) read by the image reading unit 16 (see FIG. 1). In this exemplary embodiment, the scanned image acquisition unit 21 is provided as an example of means for receiving a read image obtained by reading a document.

The bending detection unit 22 analyzes the scanned image acquired by the scanned image acquisition unit 21 to detect whether or not the document is bent. In this exemplary embodiment, the bending detection unit 22 is provided as an example of means for detecting whether or not a read image has been obtained by reading a document in a bent state.

The notification message generation unit 23 generates a notification message to be notified to a user. For example, "Bending of the document has been detected. Please check the document." may be generated as the notification message.

The thumbnail image generation unit 24 generates a thumbnail image indicating a position in a document at which bending has been detected. The thumbnail image may indicate a straight line indicating bending provided on a blank image. Alternatively, the thumbnail image may indicate a straight line indicating bending provided on a scanned image. In this case, the thumbnail image may indicate a straight line indicating bending provided on an image obtained by removing an image of a straight line indicating the bending from a scanned image. In this exemplary embodiment, a thumbnail image is provided as an example of a notification image including a straight line generated at a position where a document is bent and an example of a notification image further including at least part of a read image.

The display control unit 25 controls a notification message generated by the notification message generation unit 23 and a thumbnail image generated by the thumbnail image generation unit 24 to be displayed on the operation panel 15. In this exemplary embodiment, the display control unit 25 is provided as an example of means for notifying a user that a document is bent and an example of means for notifying, using a notification image, the user that the document is bent, in the case where a read image has been obtained by reading a document in a bent state.

The operation receiving unit 26 receives an operation performed on the operation panel 15 by a user.

Operation of Bending Detection Device

Figure 3:
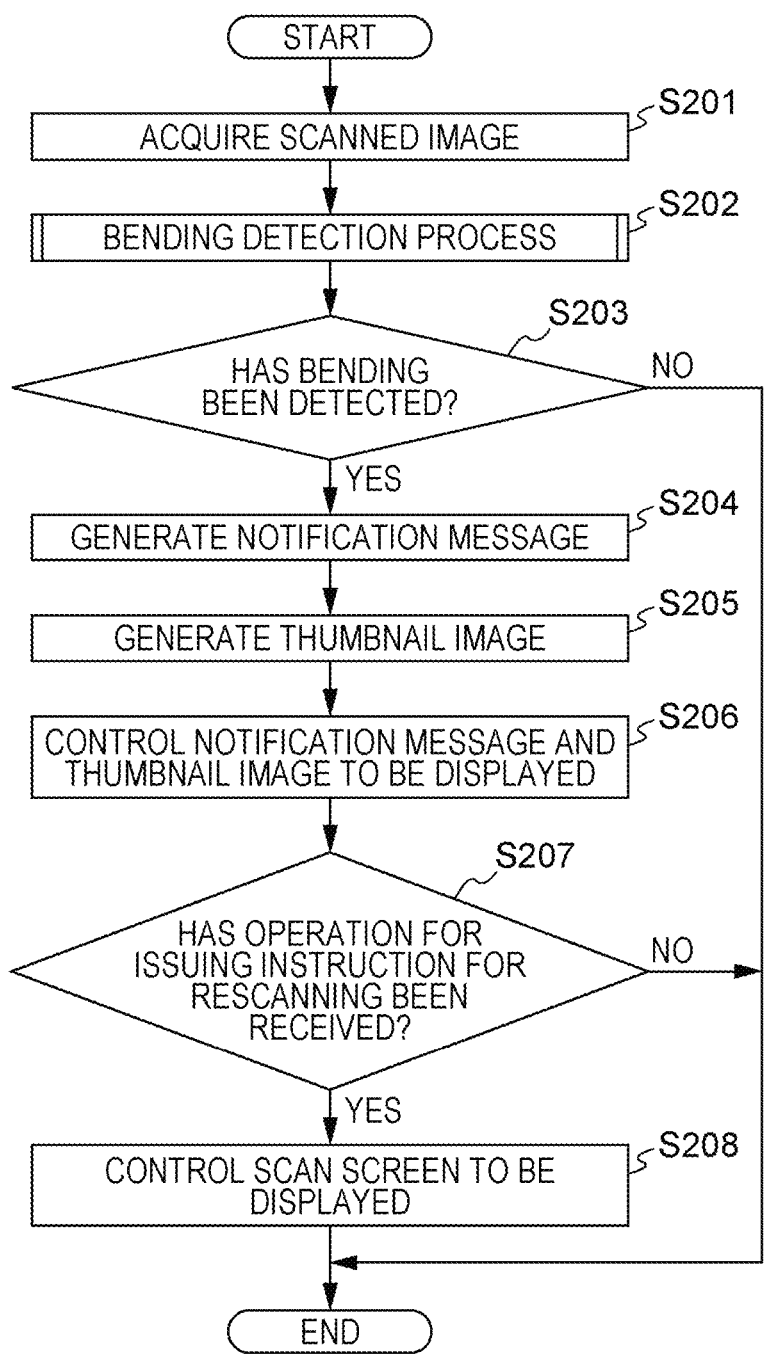
FIG. 3 is a flowchart illustrating an example of an operation of a bending detection device according to an exemplary embodiment of the present disclosure.

FIG. 3 is a flowchart illustrating an example of an operation of the bending detection device 20 according to an exemplary embodiment.

As illustrated in FIG. 3, in the bending detection device 20, the scanned image acquisition unit 21 acquires a scanned image read by the image reading unit 16 (see FIG. 1) (step 201).

Next, the bending detection unit 22 analyzes the scanned image acquired in step 201 to perform a bending detection process for detecting whether or not a document is bent (step 202). In the bending detection process in step 202, the bending detection unit 22 determines whether or not bending of the document has been detected (step 203).

In the case where it is determined in step 203 that bending of the document has been detected, the notification message generation unit 23 generates a notification message to be notified to a user (step 204). For example, "Bending of the document has been detected. Please check the document." may be generated as the notification message. In this case, the thumbnail image generation unit 24 generates a thumbnail image indicating a position in the document at which bending is generated (step 205). As described above, the notification message is generated in step 204, and the thumbnail image is generated in step 205. Then, the display control unit 25 controls the notification message and the thumbnail image to be displayed on the operation panel 15 (see FIG. 1) (step 206).

Accordingly, the notification message and the thumbnail image are displayed on the operation panel 15. The user refers to the notification message and the thumbnail image to determine whether or not the document needs to be scanned again. In the case where it is determined that the document needs to be scanned again, the user performs an operation on the operation panel 15 for issuing an instruction for rescanning. In the bending detection device 20, the operation receiving unit 26 determines whether or not an operation for issuing an instruction for rescanning has been received (step 207). In the case where it is determined in step 207 that an operation for issuing an instruction for rescanning has been received, the display control unit 25 controls a scan screen for issuing an instruction for scanning to be displayed on the operation panel 15 (step 208).

In the case where it is not determined in step 203 that bending of the document has been detected, the bending detection device 20 ends the process.

Furthermore, when referring to the notification message and the thumbnail image displayed on the operation panel 15 in step 206, the user may determine that the document does not need to be scanned again. In this case, it is not determined in step 207 that an operation for issuing an instruction for rescanning has been received, and the bending detection device 20 ends the process.

Details of Bending Detection Process

Figure 4:
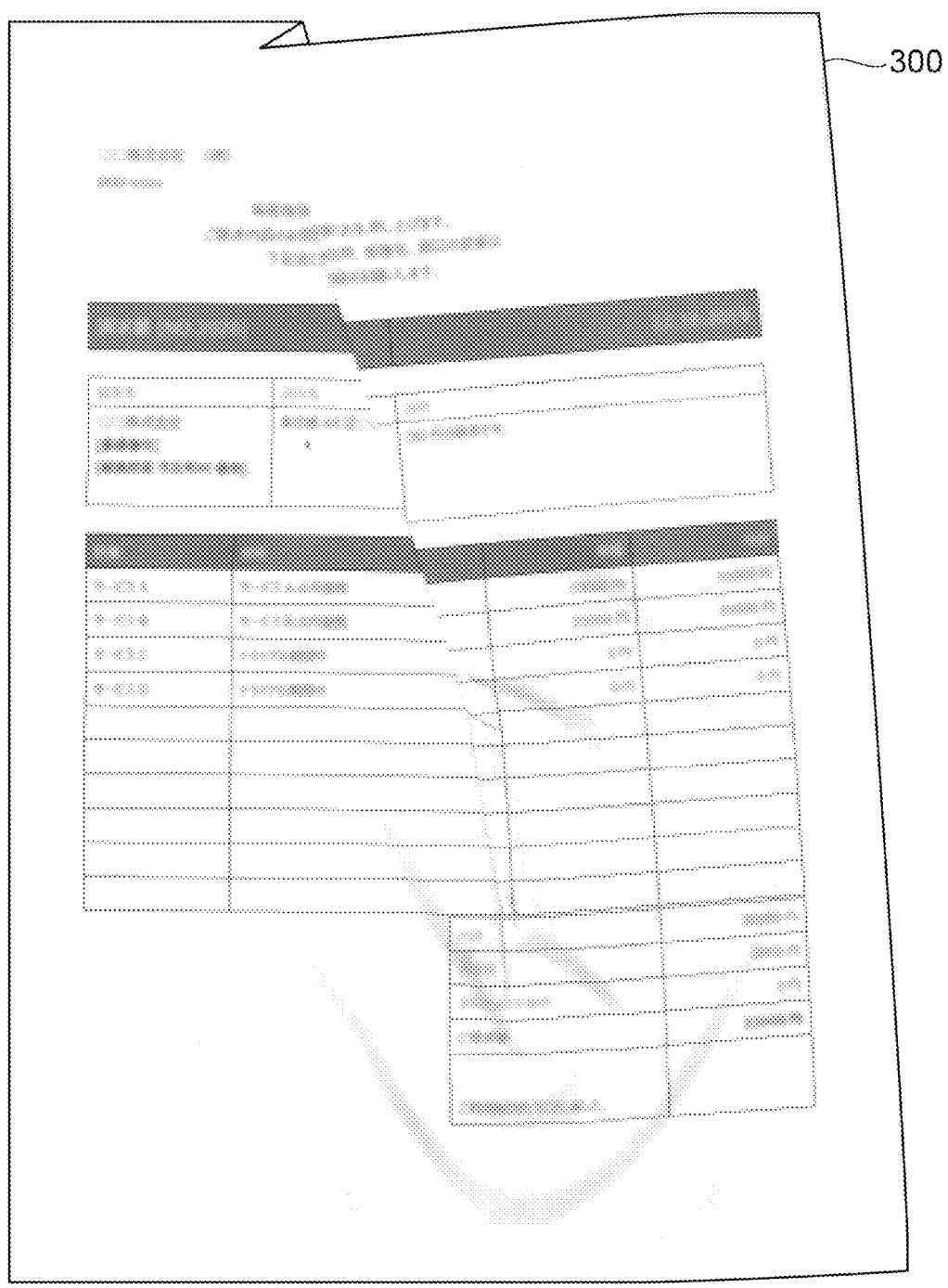
FIG. 4 is a diagram illustrating an example of a scanned image acquired by a scanned image acquisition unit.

FIG. 4 is a diagram illustrating an example of a scanned image acquired by the scanned image acquisition unit 21. Hereinafter, a bending detection process by the bending detection unit 22 will be described on the assumption that a scanned image 300 is acquired by the scanned image acquisition unit 21.

(First Bending Detection Process)

Figure 5:
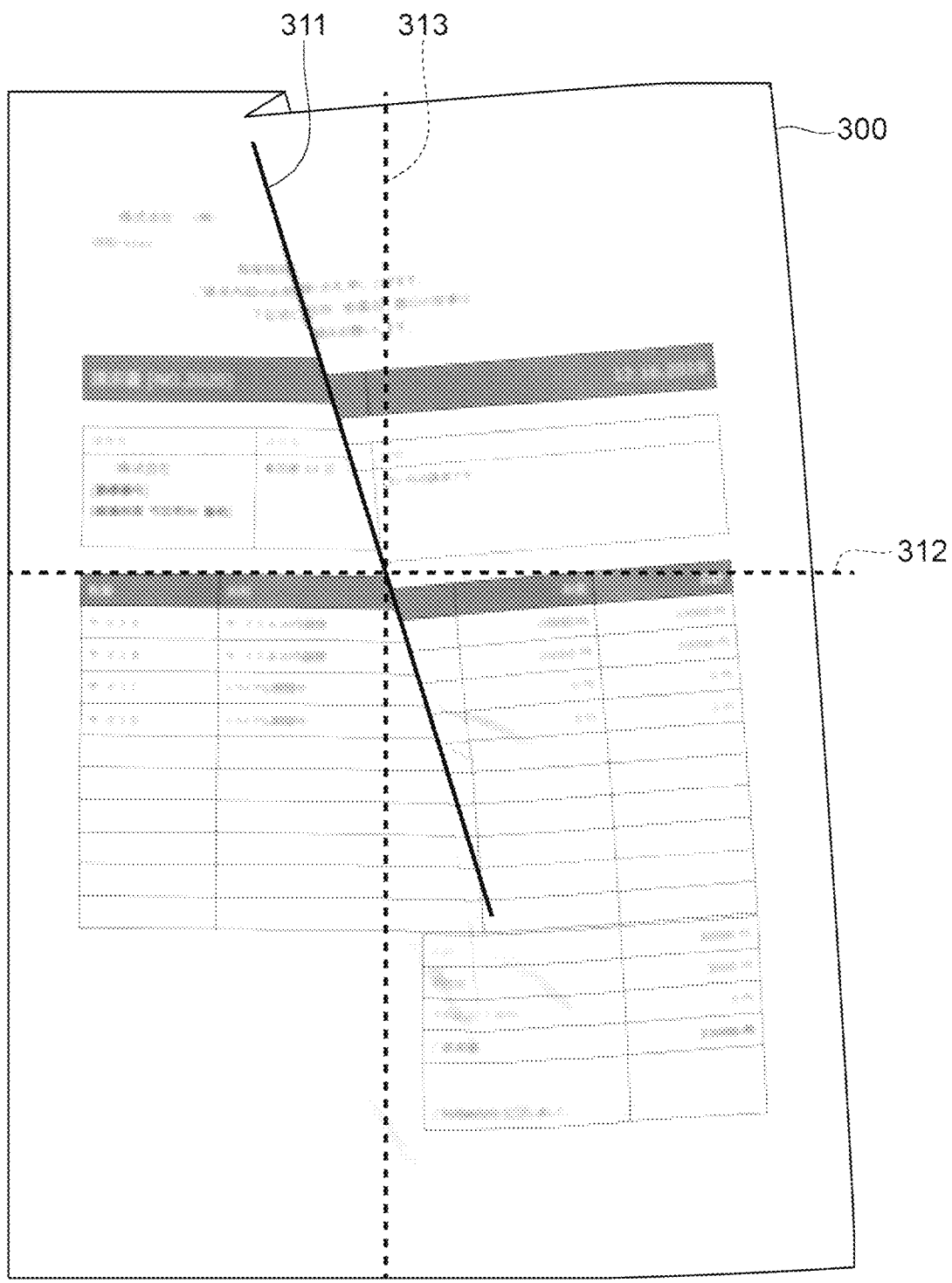
FIG. 5 is a diagram for explaining an outline of a first bending detection process.

FIG. 5 is a diagram for explaining an outline of a first bending detection process. The first bending detection process is a process for determining that, in the case where the first condition mentioned above is satisfied, a scanned image has been obtained by reading a document in a bent state. In this case, the first bending detection process is a process for detecting that a document is bent in the case where a scanned image includes a straight line forming an angle equal to or more than a threshold with respect to each of the horizontal direction and the vertical direction. This is because bending of a document often forms a straight line. Moreover, although a line intentionally drawn on a document generally extends in the horizontal direction or the vertical direction, bending of a document often occurs in a direction different from the horizontal and vertical directions. The straight line may be obtained by, for example, Hough transform.

In FIG. 5, a straight line 311 forms an angle equal to or more than a threshold with respect to a line 312 in the horizontal direction and forms an angle equal to or more than a threshold with respect to a line 313 in the vertical direction. Thus, in the first bending detection process, it is determined that the scanned image 300 has been obtained by reading a document in a bent state.

Figure 6:
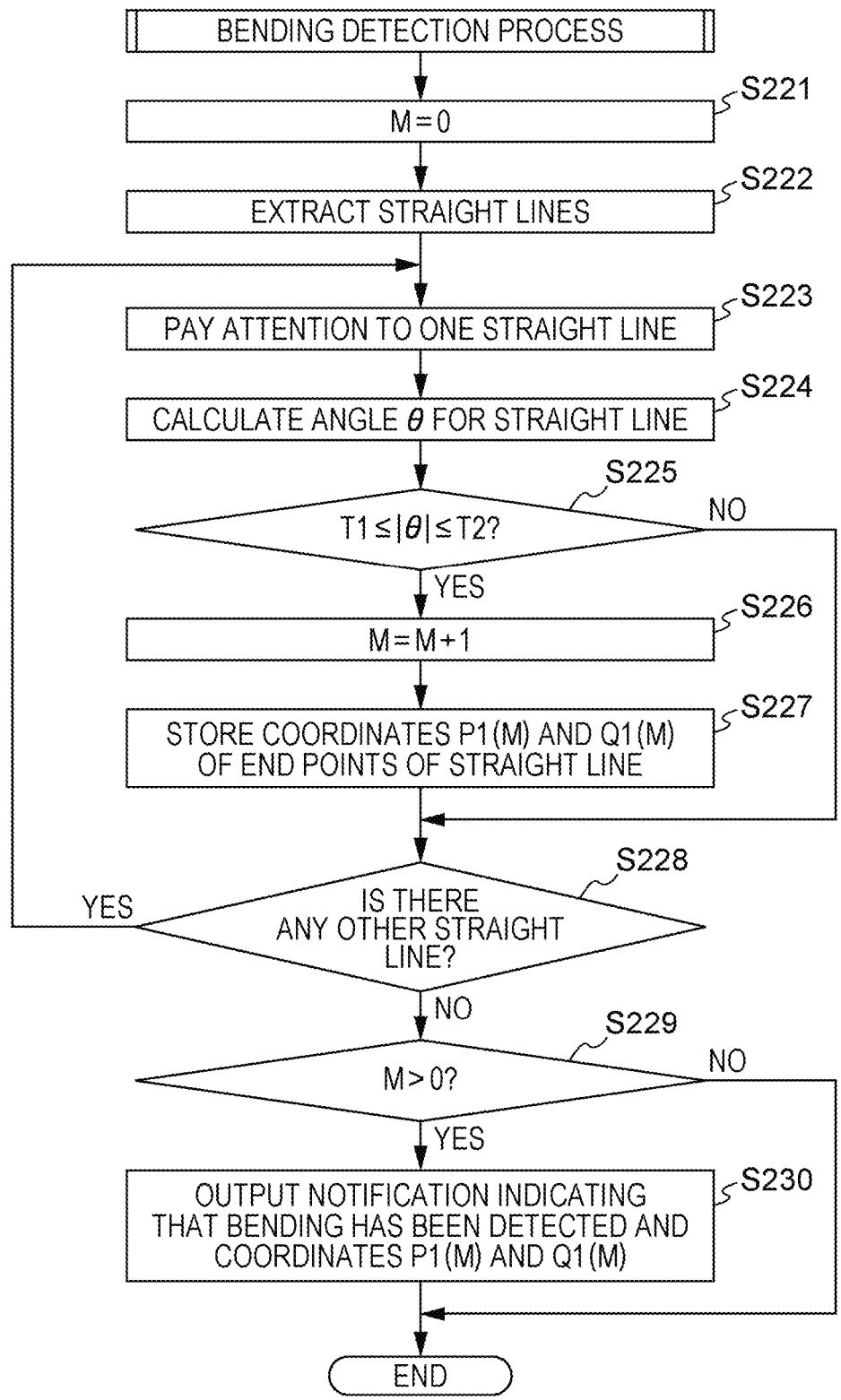
FIG. 6 is a flowchart illustrating a processing example of the first bending detection process.

FIG. 6 is a flowchart illustrating a processing example of the first bending detection process.

As illustrated in FIG. 6, the bending detection unit 22 substitutes 0 for a variable M for counting the number of straight lines representing bending (step 221). The bending detection unit 22 extracts a plurality of straight lines from the scanned image 300 (step 222). The number of straight lines may be extracted by, for example, Hough transform.

Next, the bending detection unit 22 pays attention to one of the plurality of straight lines extracted in step 222 (step 223).

Next, the bending detection unit 22 calculates an angle θ for the straight line to which attention is paid in step 223 (step 224). The bending detection unit 22 determines whether or not the absolute value of the angle θ calculated in step 224 is equal to or more than a threshold T1 and less than or equal to a threshold T2 (step 225). The threshold T1 represents the threshold for the angle formed between a straight line and a line in the horizontal direction. The threshold T2 represents the threshold for the angle formed between a straight line and the vertical direction.

In the case where it is determined in step 225 that the absolute value of the angle θ is equal to or more than the threshold T1 and less than or equal to the threshold T2, the bending detection unit 22 adds one to the variable M for counting the number of straight lines representing bending (step 226). The bending detection unit 22 stores coordinates P1(M) and Q1(M) of end points of the straight line to which attention is paid in step 223 (step 227), and the bending detection unit 22 causes the process to proceed to step 228.

In contrast, in the case where it is not determined in step 225 that the absolute value of the angle θ is equal to or more than the threshold T1 and less than or equal to the threshold T2, that is, in the case where it is determined that the absolute value of the angle θ is less than the threshold T1 or more than the threshold T2, the bending detection unit 22 causes the process to proceed to step 228.

The bending detection unit 22 determines whether or not there is any other straight line to which attention has not been paid (step 228).

In the case where it is determined in step 228 that there is a straight line to which attention has not been paid, the bending detection unit 22 causes the process to return to step 223.

In contrast, in the case where it is not determined in step 228 that there is a straight line to which attention has not been paid, the bending detection unit 22 determines whether or not the value of the variable M is more than 0 (step 229).

In the case where it is determined in step 229 that the value of the variable M is more than 0, the bending detection unit 22 outputs a notification indicating that bending of the document has been detected to the notification message generation unit 23, outputs the coordinates P1(M) and Q1(M) of the end points of the straight line stored in step 227 to the thumbnail image generation unit 24 (step 230), and ends the process. The thumbnail image generation unit 24 renders M straight lines obtained by connecting the corresponding coordinates P1(M) and Q1(M) on a blank image or a scanned image.

In contrast, in the case where it is not determined in step 229 that the value of the variable M is more than 0, that is, in the case where there is no straight line representing bending, the process ends.

(Examples of Second and Third Bending Detection Processes)

Figure 7:
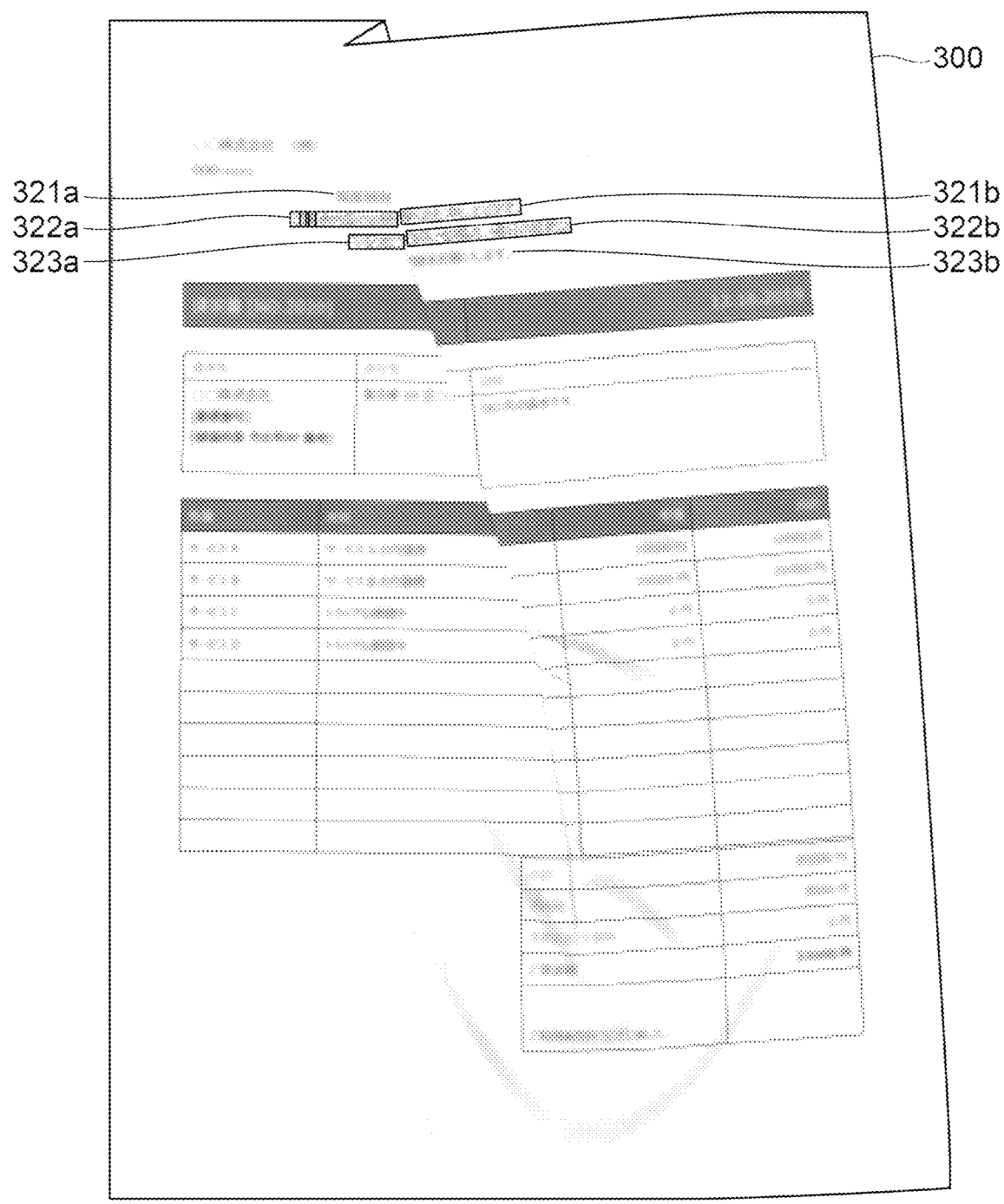
FIG. 7 is a diagram for explaining an outline of a second bending detection process.

FIG. 7 is a diagram for explaining an outline of a second bending detection process. The second bending detection process is an example of a process for determining that, in the case where the second condition and the third condition mentioned above are satisfied, a scanned image has been obtained by reading a document in a bent state.

In the second bending detection process, types of the first image elements and the second image elements in the second condition and the third condition mentioned above are represented by symbols. The symbols include characters, numbers, and symbols in a narrow sense. Here, characters are used as examples of symbols. That is, in the second bending detection process, the first string of the first image elements and the second string of the second image elements are character strings. In this case, the second bending detection process is a process for detecting that a document is bent in the case where directions of two adjacent character strings are different by an angle exceeding a threshold or an ending position of one character string and a starting position of the other character string are different. A direction of a character string may be a direction in which a plurality of coordinates obtained by performing character recognition on a plurality of characters included in the character string are connected. Furthermore, a direction of a character string may be a direction in which coordinates of a plurality of characters included in a word obtained by performing character recognition on the character string and then performing morphological analysis of the character string are connected.

In FIG. 7, directions of adjacent character strings 322a and 321b are different by an angle exceeding the threshold and an ending position of the character string 322a and a starting position of the character string 321b are slightly different. Furthermore, directions of adjacent character strings 323a and 322b are different by an angle exceeding the threshold, and an ending position of the character string 323a and a starting position of the character string 322b are slightly different. Thus, in the second bending detection process, it is determined that the scanned image 300 has been obtained by reading the document in the bent state.

Figure 8:
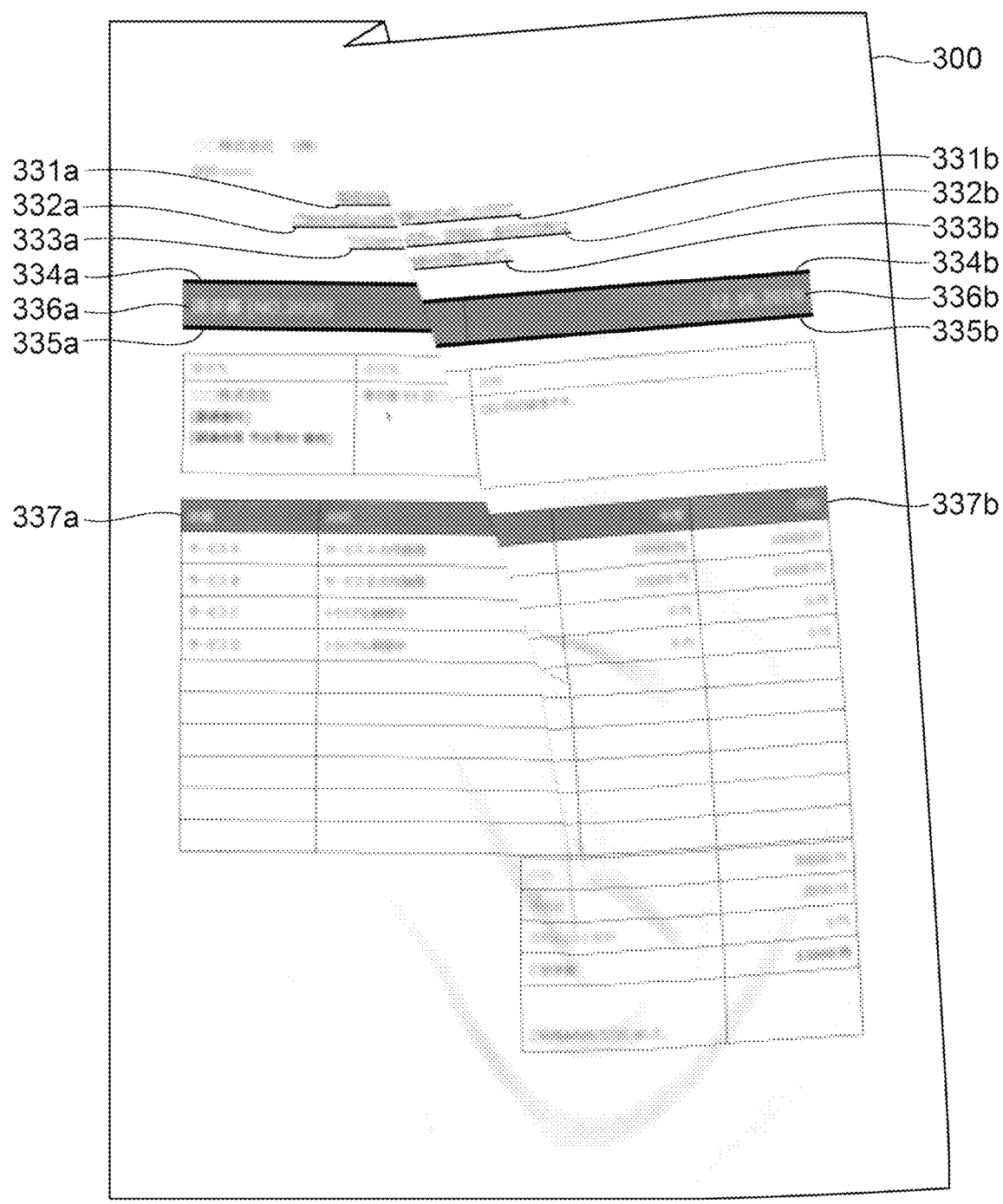
FIG. 8 is a diagram for explaining an outline of a third bending detection process.

FIG. 8 is a diagram for explaining an outline of the third bending detection process. The third bending detection process is an example of a process for determining that, in the case where the second condition and the third condition mentioned above are satisfied, a scanned image has been obtained by reading a document in the bent state.

In the third bending detection process, types of the first image elements and the second image elements in the second condition and the third condition mentioned above are represented by straight lines connecting lower limit pixels of images of symbols (hereinafter, referred to as a "lower limit line"). The symbols include characters, numbers, and symbols in a narrow sense. In this example, however, characters are used as symbols. That is, in the third bending detection process, the first string of the first image elements and the second string of the second image elements are represented by lower limit lines of images of character strings. In this case, the third bending detection process is a process for detecting that a document is bent in the case where directions of two adjacent lower limit lines are different by an angle exceeding a threshold or an ending position of one lower limit line and a starting position of the other lower limit line are different.

In FIG. 8, directions of adjacent lower limit lines 332a and 331b are different by an angle exceeding the threshold, and an ending position of the lower limit line 332a and a starting position of the lower limit line 331b are slightly different. Furthermore, directions of adjacent lower limit lines 333a and 332b are different by an angle exceeding the threshold, and an ending position of the lower limit line 333a and a starting position of the lower limit line 332b are slightly different. Thus, in the third bending detection process, it is determined that the scanned image 300 has been obtained by reading the document in the bent state.

Furthermore, in the third bending detection process, types of the first image elements and the second image elements in the second condition and the third condition mentioned above may be represented by straight lines such as ruled lines intentionally drawn on a document. In this case, the third bending detection process is a process for detecting that a document is bent in the case where directions of two adjacent ruled lines are different by an angle exceeding the threshold or an ending position of one ruled line and a starting position of the other ruled line are different. The ruled lines may be obtained by, for example, Hough transform.

In FIG. 8, directions of adjacent ruled lines 334a and 334b are different by an angle exceeding the threshold, and an ending position of the ruled line 334a and a starting position of the ruled line 334b are slightly different. Furthermore, directions of adjacent ruled lines 335a and 335b are different by an angle exceeding the threshold, and an ending position of the ruled line 335a and a starting position of the ruled line 335b are slightly different. Thus, in the third bending detection process, it is determined that the scanned image 300 has been obtained by reading the document in the bent state.

Furthermore, in the third bending detection process, types of the first image elements and the second image elements in the second condition and the third condition mentioned above may be represented by regions to which color information is added, such as blocks based on color values or brightness values. In this case, the third bending detection process is a process for detecting that a document is bent in the case where directions of two adjacent blocks based on color values or brightness values are different by an angle exceeding the threshold or an ending position of one block based on a color value or a brightness value and a starting position of the other block based on a color value or a brightness value are different.

In FIG. 8, directions of adjacent blocks 336a and 336b are different by an angle exceeding the threshold, and an ending position of the block 336a and a starting position of the block 336b are slightly different. Furthermore, directions of adjacent blocks 337a and 337b are different by an angle exceeding the threshold, and an ending position of the block 337a and a starting position of the block 337b are slightly different. Thus, in the third bending detection process, it is determined that the scanned image 300 has been obtained by reading the document in the bent state.

FIG. 9 is a flowchart illustrating a processing example of the second and third bending detection processes.

As illustrated in FIG. 9, the bending detection unit 22 substitutes 0 for a variable N for counting the number of pairs of image elements for detecting whether or not bending occurs (step 241). The bending detection unit 22 extracts a plurality of pairs of image elements from the scanned image 300 (step 242). In the case where the image elements are ruled lines, the plurality of pairs of image elements may be extracted by, for example, Hough transform. Furthermore, in the case where the image elements are character strings, lower limit lines of images of character strings, or blocks based on color values or brightness values, the plurality of pairs of image elements may be extracted by a known image processing method.

Next, the bending detection unit 22 pays attention to one of the plurality of pairs of image elements extracted in step 242 (step 243).

Next, the bending detection unit 22 calculates the distance δ between end points of the pair of image elements to which attention is paid in step 243 (step 244). The bending detection unit 22 determines whether or not the distance δ calculated in step 244 is less than a threshold T3 (step 245). The threshold T3 is a threshold for determining whether or not the distance between end points of image elements is within a predetermined distance.

In the case where it is determined in step 245 that the distance δ is less than the threshold T3, the bending detection unit 22 calculates angles α and β of directions of the pair of image elements to which attention is paid in step 243 (step 246). In the case where the image elements are character strings, the directions of the image elements may be obtained by connecting coordinate strings obtained by performing recognition processing on the character strings. In the case where the image elements are lower limit lines or ruled lines, directions of the lower limit lines or the ruled lines may be defined as the directions of the image elements. Furthermore, in the case where the image elements are blocks based on color values or brightness values, the directions of the image elements may be obtained based on directions of border lines of the blocks. The bending detection unit 22 determines whether or not the absolute value of a difference between the angles α and β calculated in step 246 exceeds a threshold T4 (step 247). The threshold T4 is a threshold for an angle formed between the direction of one of the pair of image elements and the direction of the other one of the pair of image elements.

In the case where it is determined in step 247 that the absolute value of the difference between the angles α and β exceeds the threshold T4, one is added to the variable N for counting the number of pairs of image elements for detecting whether or not bending occurs (step 248). The bending detection unit 22 calculates coordinates E(N) of an ending position of one of the pair of image elements to which attention is paid in step 243 and coordinates S(N) of a starting position of the other one of the pair of image elements (step 249), and causes the process to proceed to step 250.

In contrast, in the case where it is not determined in step 245 that the distance δ is less than the threshold T3, that is, it is determined that the distance δ is equal to or more than the threshold T3, the bending detection unit 22 causes the process to proceed to step 250. Furthermore, in the case where it is not determined in step 247 that the absolute value of the difference between the angles α and β exceeds the threshold T4, that is, in the case where it is determined that the absolute value of the difference between the angles α and β is less than or equal to the threshold T4, the bending detection unit 22 also causes the process to proceed to step 250.

Then, the bending detection unit 22 determines whether or not there is any other pair of image elements to which attention has not been paid (step 250).

In the case where it is determined in step 250 that there is another pair of image elements to which attention has not been paid, the bending detection unit 22 causes the process to return to step 243.

In contrast, in the case where it is not determined in step 250 that there is another pair of image elements to which attention has not been paid, the bending detection unit 22 determines whether or not the value of the variable N is two or more (step 251). In this example, the determination as to whether or not the value of the variable N is two or more is performed based on the assumption that a straight line representing bending may be rendered in the case where there are at least two pairs of image elements. However, the present disclosure is not limited to this. To render a straight line representing bending more accurately, a determination as to whether or not the value of the variable N is equal to or more than a predetermined value that is greater than two may be performed.

In the case where it is determined in step 251 that the value of the variable N is two or more, the bending detection unit 22 obtains a straight line passing through two or more pairs of coordinates E(N) and coordinates S(N) calculated in step 249 and stores coordinates P2 and Q2 of the end points (step 252). Then, the bending detection unit 22 outputs a notification indicating that bending of the document has been detected to the notification message generation unit 23, outputs the coordinates P2 and Q2 of the end points of the straight line stored in step 252 to the thumbnail image generation unit 24 (step 253), and ends the process. The thumbnail image generation unit 24 renders the straight line obtained by connecting the coordinates P2 and Q2 on a blank image or a scanned image.

In contrast, in the case where it is not determined in step 251 that the value of the variable N is two or more, that is, in the case where there is no image element or only one image element for detecting whether or not bending occurs, the process ends.

In this processing example, in the case where the condition that the distance δ between end points of two image elements is less than the threshold T3 and the condition that the absolute value of the difference between the angles α and β of directions of two image elements exceeds the threshold T4 are satisfied, bending of the document is detected. However, the present disclosure is not limited to this. In the case where only the condition that the distance δ between the end points of the two image elements is less than the threshold T3 is satisfied, bending of the document may be detected. Alternatively, in the case where only the condition that the absolute value of the difference between the angles α and β of the directions of the two image elements exceeds the threshold T4 is satisfied, bending of the document may be detected.

For example, a process performed by the bending detection device 20 according to an exemplary embodiment is prepared as a program such as application software.

That is, a program implementing an exemplary embodiment is regarded as a program for causing a computer to implement a function for receiving a read image obtained by reading a document and a function for notifying a user that the document is bent in the case where the read image has been obtained by reading the document in a bent state.

A program for implementing an exemplary embodiment may not only be provided by communication means but also may be stored in a recording medium such as a compact disc-read only memory (CD-ROM) and provided.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A bending detection device comprising:
a processor configured to
receive a read image obtained by reading a document, and
notify a user of a bend in the document based on a determination that the read image has been obtained by reading the document in a bent state,
wherein the processor is configured to determine that the read image has been obtained by reading the document in the bent state when a condition is satisfied,
wherein the condition includes the read image including a first string of first image elements arranged in a first direction and a second string of second image elements arranged in a second direction,
wherein the first image elements and the second image elements are of a same type.

2. The bending detection device according to claim 1, wherein the processor is configured to determine that the read image has been obtained by reading the document in the bent state in a case where the read image includes a straight line indicating the bend in the document.

3. The bending detection device according to claim 2, wherein the straight line is determined to indicate the bend in the document when the straight line forms an angle equal to or more than a threshold with respect to a horizontal direction and forms an angle equal to or more than a threshold with respect to a vertical direction.

4. The bending detection device according to claim 1, wherein the condition further includes the first string ending at a first position and the second string starting at a second position different from the first position, the second position being within a predetermined distance from the first position.

5. The bending detection device according to claim 1, wherein the first string of the first image elements and the second string of the second image elements are (a) strings of symbols, (b) strings of straight lines, or (c) strings of regions with color information.

6. The bending detection device according to claim 5,
wherein the first string of the first image elements and the second string of the second image elements are strings of symbols,
wherein the first direction is determined based on a first set of coordinates obtained by performing recognition of the first string of the first image elements, and
wherein the second direction is determined based on a second set of coordinates obtained by performing recognition of the second string of the second image elements.

7. The bending detection device according to claim 6,
wherein the first set of coordinates is obtained by performing morphological analysis of the first string of the first image elements, and
wherein the second set of coordinates is obtained by performing morphological analysis on the second string of the second image elements.

8. The bending detection device according to claim 1,
wherein the first string of first image elements ending at the first position and a second string of second image elements starting at a second position different from the first position.

9. The bending detection device according to claim 8, wherein the first position and the second position are within a predetermined distance.

10. The bending detection device according to claim 1, wherein the processor is configured to notify the user of the bend in the document by using a notification image including a straight line of the bend in the document.

11. The bending detection device according to claim 10, wherein the notification image further includes at least part of the read image.

12. An image processing apparatus comprising:
a scanner that reads a document to obtain a read image; and
a processor configured to notify a user of a bend in the document based on a determination that the read image has been obtained by the scanner reading the document in a bent state,
wherein the processor is configured to determine that the read image has been obtained by reading the document in the bent state when a condition is satisfied,
wherein the condition includes the read image including a first string of first image elements arranged in a first direction and a second string of second image elements arranged in a second direction,
wherein the first image elements and the second image elements are of a same type.

13. A bending detection device comprising:
means for receiving a read image obtained by reading a document;
means for notifying a user of a bend in the document based on a determination that the read image has been obtained by reading the document in a bent state; and
means for determining that the read image has been obtained by reading the document in the bent state when a condition is satisfied,
wherein the condition includes the read image including a first string of first image elements arranged in a first direction and a second string of second image elements arranged in a second direction,
wherein the first image elements and the second image elements are of a same type.

* * * * *